United States Patent Office 2,805,719
Patented Sept. 10, 1957

2,805,719

HIGH TEMPERATURE WELL CEMENTING

Francis M. Anderson, Duncan, Okla., assignor to Halliburton Oil Well Cementing Company, Duncan, Okla.

No Drawing. Application September 15, 1955,
Serial No. 534,613

4 Claims. (Cl. 166—29)

This invention generally relates to cementing processes and more particularly to a cementing process which provides a cement composition having extended strength when set and aged at elevated temperatures.

The processes, equipment, and cement compositions for cementing oil wells are presently highly developed and satisfactory results are almost universal. In particular, the cement compositions used in well cementing have several modifications, each of which has been developed to overcome some adverse condition found in well cementing. These modifications include properties for accelerated setting, retarded setting, chemical resistance, and high early strength.

It is currently known that the bottom hole temperatures of wells increase in proportion to their depth. In studies conducted by an American Petroleum Institute committee for the Gulf Coast area it was found that this increase is closely approximated by the expression:

$$80° F. + (.015 \times \text{depth in feet})$$

It is then seen that temperatures of 200° F. may be encountered below 8,000 feet and temperatures of 400° F. and above may be encountered at 20,000 feet and below. Of course individual wells may vary considerably, some having higher and some lower temperatures.

In present oil well drilling practice, with wells commonly ranging from 8,000 to 14,000 feet, high temperatures are encountered in the well bores which are to be cemented. These elevated temperatures cause conventional Portland cement, which will initially set to normal strength, to later retrogress to lower strengths. This is apparently caused by a decomposing of the cement mass as it ages at such temperatures. The problem of strength retrogression at high temperatures has not heretofore been solved satisfactorily and is becoming of greater concern as wells are drilled and completed in deeper formations. For example: A well drilled to 16,000 feet will have a bottom hole temperature of about 320° F. During controlled trials, conventional Portland cement was allowed to set and age at this temperature and subsequently tested at various periods. Its compressive strength at this temperature dropped steadily from an initial strength (24 hrs.) of 4800 p. s. i. to a 14 day strength of 1200 p. s. i. with indications for further decrease. It is evident that such a strength retrogression under actual well conditions could become a serious problem. Of course higher temperatures, i. e. deeper wells, would make this retrogression even more pronounced.

Accordingly, the principal objects of this invention are to provide an improved cementing which provides a cement composition which initially sets to an acceptable compressive strength and thereafter retains or increases this initial strength at high temperatures.

The invention may be briefly described as an improved process for cementing a well or other earth formation wherein high temperatures exist, in which the cement composition will have progressively greater strength when situated in said formation, the steps consisting of, mixing in controlled proportions with Portland cement a flour of silica, adding water sufficient to make a slurry, placing said slurry in said formation, and allowing said slurry to set and age in said formation.

In practicing the invention, the Portland cement component of the improved composition will comprise between 25% and 90% by weight of the mixture. The cement employed will usually be a high grade Portland cement. No restriction is intended for a particular cement, however, as all Portland cements which are to be set and aged at high temperatures will have improved strength characteristics when used in accordance with this invention.

The silica flour will be employed in an amount no less than 10% by weight and no more than 75% by weight. The silica flour is desired for its chemical characteristics and when employed in the invention all impurities are regarded as either inert or of adverse benefit. Such flour should also be of extreme fineness, having all particles passing through a No. 200 sieve. It is also believed that both opaline and quartzite types of silica are well suited for the improved composition of this invention.

In providing the improved composition of this invention it is preferred to intimately mix the silica flour with the Portland cement before adding water. Such mixing will present a more homogeneous composition for subsequent chemical reaction as later described. Such mixing is usually better accomplished by conventional stationary bulk blending equipment. When the dry mixture is mixed with water, it may be stated as a general rule that the water-to-dry mixture ratio will ordinarily be selected, within practical limits, on the basis of the desired strength of the set cement, the density, or the consistency which is desired of the cement slurry.

Cement slurries made up in accordance with the previous description were allowed to set up under temperatures of fluid 200° F., 260° F., 290° F., and 320° F. respectively and all at pressures of 3,000 p. s. i. for periods of 1, 3, 7, and 14 days respectively. Specimens for each temperature were then tested at each respective period.

It was found that the improved composition as described had an initial set (24 hr.) strength increasing roughly proportional to the temperature in which set. It was further found that the composition, at each respective temperature, universally increased in strength between each test period. The following compressive strengths are representative of these tests:

| Temp., °F. | Strength, p. s. i., 24 Hrs. | Strength, p. s. i., 72 Hrs. | Strength, p. s. i., 7 Days |
|---|---|---|---|
| 320° | 4,400 | 4,650 | 5,150 |
| 290° | 3,750 | 4,950 | 5,400 |
| 260° | 2,800 | 4,000 | 4,550 |
| 200° | 1,300 | 1,950 | 2,850 |

As before described, conventional Portland cement behaved quite the reverse of the above improved composition. The following compressive strengths are representative of the conventional Portland cement which was tested under identical conditions:

| Temp., °F. | Strength, p. s. i., 24 Hrs. | Strength, p. s. i., 72 Hrs. | Strength, p. s. i., 7 Days |
|---|---|---|---|
| 320° | 4,800 | 3,400 | 1,200 |
| 290° | 7,000 | 5,800 | 3,900 |
| 260° | 6,500 | 5,200 | 4,000 |
| 200° | 7,900 | 7,600 | 7,100 |

It is now seen, when comparing the test data of the improved composition to that of the conventional Portland cement, that greater ultimate strength will be found in the improved composition when set at temperatures of 200° F. and above.

The precise chemical interaction between the Portland cement and the silica is not known. It is believed that, in the presence of elevated temperatures, the excess lime given off by the setting reaction of the Portland cement reacts and combines with the silica flour; thus forming water insoluble calcium silicates and giving additional strength to the mass. However, from the tests made the reaction does not apparently occur at low or ambient temperatures.

It is therefore pointed out that this improved composition will be desirable in wells having temperatures above 200° F. and believed to be a necessity at temperatures above 260°.

As known in the art the fineness of Portland cement is a determining factor to its set strength; thus cement quality standards usually limit the cement to a fineness such that 85–95% will pass through a No. 325 sieve. So it is with the silica particles as used in this invention. It has been found that optimum results are attained when most of the silica flour will pass through a No. 325 sieve.

The proportions of silica flour and Portland cement as used in this invention may vary considerably depending on the strength desired and the temperature of the well to be cemented. Generally the proportion of silica flour is increased with increased temperatures. Routine laboratory tests with individual Portland cements at various temperatures will determine the exact proportions to be provided.

With the particular Portland cement used in the previously described cements, it was found that the silica flour could vary from a minimum of 10% by weight at 200° F. to a maximum of 75% by weight at elevated temperatures and give consistently satisfactory results. The data heretofore presented were obtained from compositions provided with 50% by weight of silica flour.

Few exact minimum standards have been set for compressive strengths of oil well cements. Different companies have their own minimum strength requirements and, although these vary, one such requirement is a 500 p. s. i. compressive strength in 24 hours based on laboratory tests. However, wells are being drilled to greater depths and in view of the higher temperatures and increased pressures found in these, it is expected that more rigorous standards will be established. As evident in the foregoing description, conventional Portland cement slurries will not be able to meet such standards, especially if ultimate rather than 24 hour strengths are required.

While this improved process has been described in use in oil wells, it is forseen that it could be used to an advantage in other situations where high setting and aging temperatures are encountered and strength retrogression cannot be tolerated.

Though preferred compositions, slurries, and methods of making this invention have been disclosed, it is to be understood that the invention is capable of considerable variation, all within the scope of the attached claims. It is therefore claimed:

1. A process for cementing a well or other earth formation wherein high temperatures exist, in which the cement composition will have progressively greater strength when situated in said formation, the steps consisting, mixing with Portland cement a flour of silica in proportions of 10% to 75% by weight of the total dry mixture, adding water sufficient to form a fluid slurry, placing said slurry in a formation wherein temperatures above 200° F. exist, and holding said slurry in said formation until setting occurs.

2. A process for cementing oil wells or other earth formations, the steps consisting, placing a fluid slurry in a formation wherein a temperature above 200° F. exists, said fluid slurry consisting of Portland cement mixed with a flour of silica in proportion of 10% to 75% by weight of the total dry mixture and water sufficient to form said fluid slurry, and retaining said slurry in said formation until said slurry sets to a solid mass.

3. A process for cementing a well or other earth formation in which the cement composition will have progressively greater strength when situated in said formation, the steps consisting, mixing with Portland cement a flour of silica in proportions of 10% to 75% by weight of the total dry mixture, said flour of silica being of sufficient fineness to pass a No. 200 sieve, adding water sufficient to form a fluid slurry, placing said slurry in a formation wherein temperatures above 200° F. exist, and holding said slurry in said formation until setting occurs.

4. A process for cementing oil wells or other earth formations the steps consisting, placing a fluid slurry in a formation wherein a temperature above 200° F. exists, said fluid slurry consisting of Portland cement mixed with a flour of silica in proportion of 10% to 75% by weight of the total dry mixture and water sufficient to form said fluid slurry, said flour of silica being of sufficient fineness to pass a No. 200 sieve, and retaining said slurry in said formation until said slurry sets to a solid mass.

References Cited in the file of this patent

UNITED STATES PATENTS

| | | |
|---|---|---|
| 1,584,579 | Wig | May 11, 1926 |
| 1,696,899 | Baccovich | Jan. 1, 1929 |
| 2,176,862 | Moreton | Oct. 17, 1939 |
| 2,250,107 | Nelles | July 22, 1941 |
| 2,326,577 | Teague | Aug. 10, 1943 |
| 2,410,954 | Sharp | Nov. 12, 1946 |
| 2,511,725 | Lobaugh | June 13, 1950 |
| 2,609,882 | Morgan et al. | Sept. 9, 1952 |